United States Patent
Areh et al.

(10) Patent No.: US 6,604,455 B2
(45) Date of Patent: Aug. 12, 2003

(54) FOOD PROCESSOR

(75) Inventors: Marko Areh, Radlje Ob Dravi (SI); Stanislav Mazej, Gomilsko (SI); Jurij Pesec, Petrovce (SI)

(73) Assignee: BSH Bosch und Siemens Hausgeräte GmbH, Munich (DE)

( * ) Notice: Subject to any disclaimer, the term of this patent is extended or adjusted under 35 U.S.C. 154(b) by 0 days.

(21) Appl. No.: 10/260,641

(22) Filed: Sep. 30, 2002

(65) Prior Publication Data

US 2003/0070566 A1 Apr. 17, 2003

Related U.S. Application Data

(63) Continuation of application No. PCT/EP01/02082, filed on Feb. 23, 2001.

(30) Foreign Application Priority Data

Mar. 31, 2000 (DE) .......................... 100 16 297

(51) Int. Cl.$^7$ ............................. A23N 1/00; A23N 1/02; A23L 1/00
(52) U.S. Cl. ............................. 99/510; 99/495; 99/509; 99/513
(58) Field of Search ........................ 99/484, 486, 489, 99/492, 495, 509–513; 210/380.1, 360.1; 241/37.5, 73, 92, 86.1, 89.3, 282.2, 282.1, 261.1, 101.2, 199.12; 366/314, 601, 205, 206; 426/61, 63, 49, 52, 533, 599; 494/36, 43, 56, 58

(56) References Cited

U.S. PATENT DOCUMENTS

| | | | |
|---|---|---|---|
| 4,840,119 A | * | 6/1989 | Caldi .......................... 99/512 |
| 4,852,814 A | | 8/1989 | Amiot et al. |
| 5,031,522 A | * | 7/1991 | Brixel et al. .................. 99/511 |
| 5,271,572 A | * | 12/1993 | Grandi .................... 99/37.5 X |
| 5,421,248 A | * | 6/1995 | Hsu ............................. 99/512 |
| 5,433,144 A | | 7/1995 | Lee |
| 5,669,289 A | * | 9/1997 | Chen .......................... 99/511 |
| 5,761,993 A | * | 6/1998 | Ling et al. ................ 241/92 X |
| 5,924,357 A | * | 7/1999 | Chen ....................... 210/360.1 |
| 6,012,837 A | * | 1/2000 | Thuma ..................... 99/348 X |
| 6,095,677 A | * | 8/2000 | Karkos, Jr. et al. ....... 99/509 X |
| 6,189,441 B1 | * | 2/2001 | Baudet et al. ................ 99/510 |
| 6,417,837 B1 | * | 7/2002 | Obersteiner .................. 99/509 |

FOREIGN PATENT DOCUMENTS

DE 1 093 961 12/1960

* cited by examiner

Primary Examiner—Timothy F. Simone
(74) Attorney, Agent, or Firm—Laurence A. Greenberg; Werner H. Stemer; Ralph E. Locher

(57) ABSTRACT

A strainer press for a food processor, which has a pot-shaped straining part that can be placed in a manner proof against rotation in the mixing bowl of the food processor and is provided with through-apertures, and an assigned pressing tool that has, on a hub part that can be coupled to a driveshaft of the food processor, a plurality of pressing blades, which rotate at a short axial distance above the straining part. In the pressing tool, each of the pressing blades is provided, on its side facing the straining part, with a plurality of rib-like protuberances extending substantially over the entire length of the pressing blades and additionally includes, at its trailing end edge in the direction of rotation, a cutting edge projecting toward the straining part. Such a strainer press is notable for a simple structural configuration and efficient operation.

33 Claims, 3 Drawing Sheets

FOOD PROCESSOR

CROSS-REFERENCE TO RELATED APPLICATION

This application is a continuation of copending International Application No. PCT/EP01/02082, filed Feb. 23, 2001, which designated the United States and was not published in English.

BACKGROUND OF THE INVENTION

FIELD OF THE INVENTION

The invention relates to a strainer press for a food processor.

SUMMARY OF THE INVENTION

It is accordingly an object of the invention to provide a food processor that overcomes the hereinafore-mentioned disadvantages of the heretofore-known devices of this general type and that has a simple structural configuration and is notable for efficient operation.

With the foregoing and other objects in view, there is provided, in accordance with the invention, a strainer press for a food processor having a driveshaft, a mixing bowl, and a pot-shaped straining part having through-apertures and being disposed in the mixing bowl in a rotationally fixed manner with respect to the mixing bowl, the strainer press including a pressing tool having a hub part removably secured to the driveshaft and at least two pressing blades rotating in a rotation direction at a given distance above the straining part, each of the at least two pressing blades having a side facing the straining part, a trailing end edge with respect to the rotation direction, a plurality of rib-shaped protuberances extending substantially over an entire length of the at least two pressing blades on the side facing the straining part, and a cutting edge projecting toward the straining part and disposed at the trailing end edge. The given distance is, preferably, substantially adjacent the straining part.

According to the invention, a strainer press for a food processor, which includes a pot-shaped straining part that can be placed in a rotationally fixed manner in the mixing bowl of the food processor and is provided with through-apertures, and an assigned pressing tool, which includes, on a hub part that can be coupled to a driveshaft of the food processor, at least two pressing blades, which rotate at a short axial distance above the straining part, in which pressing tool each of the pressing blades is provided, on its side facing the straining part, with a plurality of rib-like protuberances extending substantially over the entire length of the pressing blades and additionally includes, at its trailing end edge in the direction of rotation, a cutting edge projecting toward the straining part. Such a press includes merely two parts, one being the straining part that can be inserted into the mixing bowl of the food processor and the other being the pressing tool that can be coupled to the driveshaft and that merely needs to be fitted by its hub part onto the free end of the driveshaft. The pressed material is entrained by the rib-like protuberances on the pressing blades in the course of the rotation of the pressing blades and, to the extent that it has not already been forced through the through-apertures, reaches the cutting edge. More solid constituents present in the pressed material are then also comminuted by the cutting edge. In addition, the rib-like protuberances exert a retaining function on the pressed material. As a result, rapid pressing is ensured.

In accordance with another feature of the invention, it has proven particularly favorable if the pot base of the straining part is inclined in a funnel-shape toward the middle of the pot and the pressing blades extend in a correspondingly inclined manner to match the pot base, inclined in a funnel-shape, of the straining part. As a result, the pressed material in the straining part is forced radially inward to the center of the straining part and shows a less pronounced tendency to move away during the comminuting (pulverizing/chopping/cutting) operation.

In accordance with a further feature of the invention, as a result of the fact that the pressing blades are of curved form in the circumferential direction such that the leading edge, in the direction of rotation, of each pressing blade is raised relative to the pot base of the straining part, the pressed material necessarily passes under the pressing blades and is then crushed, the rib-like protuberances assisting the rapid and selective comminuting of the pressed material.

In accordance with an added feature of the invention, the conveying of the pressed material toward the central region of the straining part, already encouraged by the funnel-shaped course of the pot base, is further improved by decreasing the pitch of the curvature, starting from the hub part, toward the free end of the pressing blades. As a result of such a curvature, a helical surface oriented toward the center of the straining part is produced whereby the pressed material is conveyed toward the center.

In accordance with an additional feature of the invention, it has an advantageous effect on the onward transportation of the pressed material in the straining part if rib-like protuberances are provided over the entire width of the pressing blades.

In accordance with yet another feature of the invention, it is advantageous if the rib-like protuberances possess a sawtooth cross-section with a front flank rising gently against the direction of rotation of the pressing blades. In such a case, the pressed material is entrained by the protuberances but cannot remain adhering thereto.

In a strainer press for a food processor having a driveshaft guided from below through a tubular connector provided at the center of the mixing bowl, in accordance with yet a further feature of the invention, it is particularly advantageous if the straining part includes, centered relative to the middle of its pot base, a dome-like protuberance extending into the hub part of the pressing tool and, if a circumferential channel is formed in the transitional region between the dome-like protuberance and the pot base, into which circumferential channel a circumferential rim projecting axially on the hub part engages. As a result of the dome-shaped protuberance, an inner pot shell is formed in the interior of the straining part, by which the advancing of the pressed material to the driveshaft is prevented. Such an advance is already substantially prevented by the engagement into one another of the circumferential rim of the hub part and the circumferential channel of the straining part. The parts engaging into one another act like a labyrinth seal.

Constituents of the pressed material that enter the circumferential channel in liquid or even semisolid form can emerge from the circumferential channel through the through-bore provided at the bottom of the circumferential channel and prevent clogging of the circumferential channel.

In accordance with yet an added feature of the invention, there is an increase in the efficiency of the strainer press if at least some of the through-apertures of the straining part are provided in base recesses formed on its pot base and extending in a spoke pattern, the base recesses possessing a wedge-shaped cross-section with a declining leading flank in the direction of rotation of the pressing blades. As a result of the fact that the base recesses are formed with a wedge-shaped cross-section, a sharp angled edge is produced, lying in the direction of rotation of the pressing blades, which interacts with the cutting edge provided on the pressing blades in the manner of a pair of scissors. Thus, even relatively solid constituents of the pressed material can be effectively comminuted.

In accordance with yet an additional feature of the invention, as a result of the fact that the base recesses follow, in their direction of radiation, a sickle-shaped course curved counter to the direction of rotation of the pressing blades, the strainer press works in a substantially impact-free manner because the angled edges of the base recesses and the cutting edges come into engagement only gradually because of the sickle-shaped course of the angled edges in the direction of the radial extent of the pressing blades.

In accordance with again another feature of the invention, clogging of the through-apertures of the straining part is avoided by broadening the through-apertures in their cross-section toward the discharge side of the pressed material.

In accordance with again a further feature of the invention, rib-like shoulders are provided on the straining part and interact with corresponding ribs formed on the mixing bowl to form an anti-twisting device for the straining part inserted into the mixing bowl.

In accordance with again an added feature of the invention, the strainer press can be formed particularly cost-effectively from a small number of individual parts if, in accordance with a further preferred embodiment of the subject of the invention, the pressing tool and the straining part are formed from injection-molded plastics.

In accordance with again an additional feature of the invention, the depth of the base recesses, which extend at least approximately in a spoke-like pattern, increase from their end nearer the center to their end remote from the center. As a result, in the high circumferential speed range of the pressing tool, the back-up space available in the straining part for pressed material is enlarged. This results in improved pressing operation.

With the objects of the invention in view, in a food processor having a driveshaft, a mixing bowl, and a pot-shaped straining part having through-apertures and being disposed in the mixing bowl in a rotationally fixed manner with respect to the mixing bowl, there is also provided a strainer press including a pressing tool having a hub part removably secured to the driveshaft and at least two pressing blades rotating in a rotation direction at a given distance above the straining part, each of the at least two pressing blades having a side facing the straining part, a trailing end edge with respect to the rotation direction, a plurality of rib-shaped protuberances extending substantially over an entire length of the at least two pressing blades on the side facing the straining part, and a cutting edge projecting toward the straining part and disposed at the trailing end edge.

With the objects of the invention in view, there is also provided a food processor, including a driveshaft, a mixing bowl, a pot-shaped straining part having through-apertures, the straining part removably disposed in the mixing bowl in a rotationally fixed manner with respect to the mixing bowl; and a pressing tool having a hub part removably secured to the driveshaft and at least two pressing blades rotating in a rotation direction at a given distance above the straining part, each of the at least two pressing blades having a side facing the straining part, a trailing end edge with respect to the rotation direction, a plurality of rib-shaped protuberances extending substantially over an entire length of the at least two pressing blades on the side facing the straining part, and a cutting edge projecting toward the straining part and disposed at the trailing end edge.

Other features that are considered as characteristic for the invention are set forth in the appended claims.

Although the invention is illustrated and described herein as embodied in a food processor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
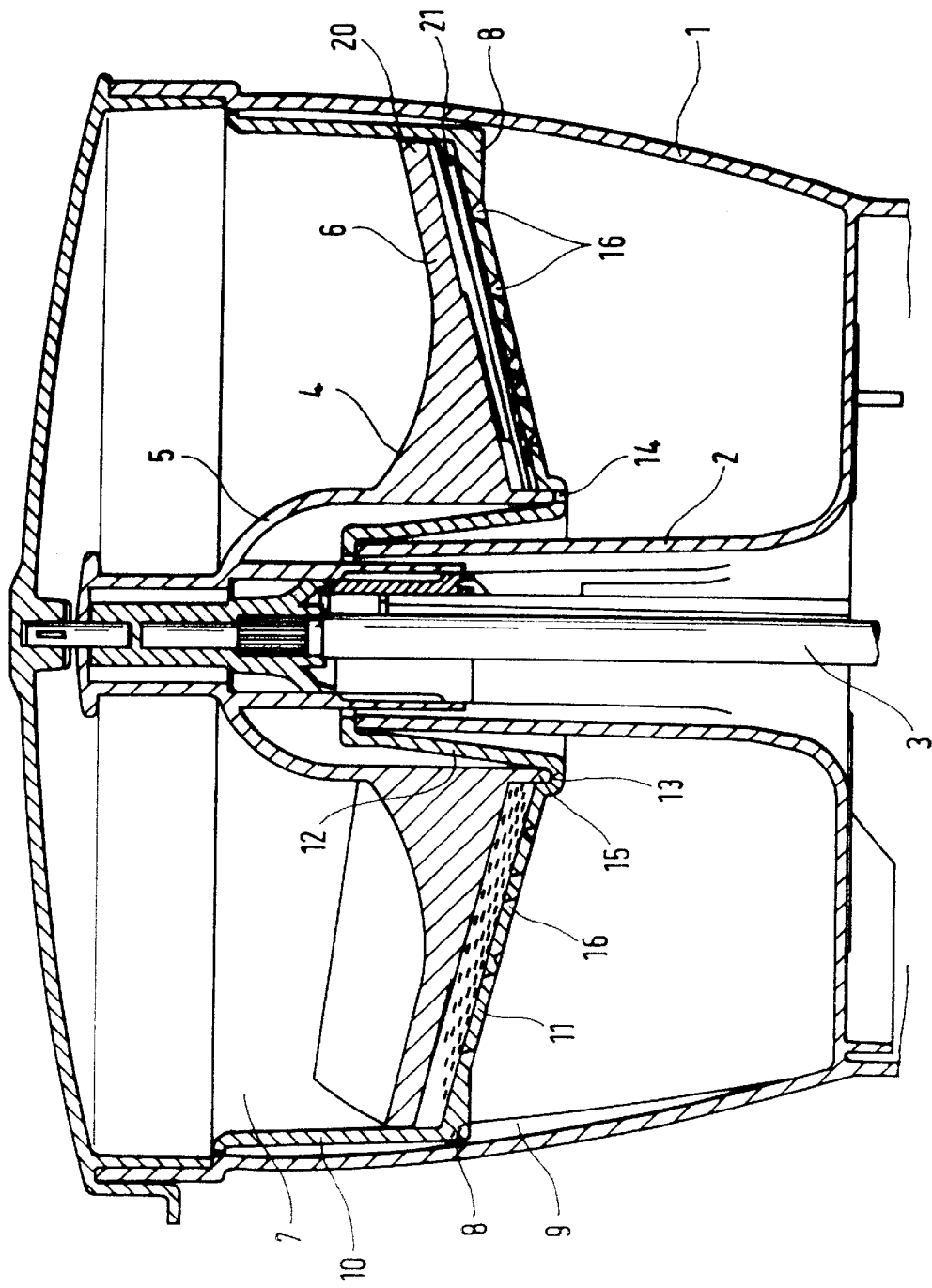
FIG. 1 is a fragmentary, cross-sectional view of a pressing tool inserted into the mixing bowl of a food processor according to the invention.

Referring now to the figures of the drawings in detail and first, particularly to FIG. 1 thereof, there is shown a mixing bowl 1 of a food processor having a tubular connector 2 at its center through which an output shaft or driveshaft 3 is guided upward. The driveshaft 3 is driven below the base of the mixing bowl 1 by the non-illustrated drive motor of the food processor. A pressing tool 4 is fitted by its hub part 5 onto the end of the driveshaft 3 provided with dogs projecting from the connector 2. For such a purpose, the hub part 5 has seatings interacting in a fitting aperture with the dogs of the driveshaft 3. As a result of the engagement of the dogs into the seatings, a rotation-proof coupling of the pressing tool 4 with the driveshaft 3 is achieved.

On the outside of the hub part 5, which has a bell-shaped form, are molded two pressing blades 6 extending radially outward. These pressing blades 6, in the operating state, are located in the receiving space of a straining part 7 that has a pot-shaped form and is inserted into the mixing bowl 1. Rib-like shoulders 8 are provided on the straining part 7, interacting with ribs 9 formed on the mixing bowl 1 and securing the straining part 7 against twisting. The straining part 7 is bounded by a pot shell 10. The pot base 11 of the straining part 7 is inclined toward the pot center in the manner of a funnel. Formed in the central region of the straining part 7 is a dome-shaped protuberance 12, by which the straining part 7 is fitted onto the free end of the connector 2 of the mixing bowl 1. A circumferential channel 13 is formed in the pot base 11 in the transitional region between the dome-shaped protuberance 12 and the pot base 11. The circumferential channel 13 includes at least one through-bore 14 in its base through which the liquid portions or even semi-solid constituents of the pressed material which have emerged from the pressed material and entered the circumferential channel 13 can be removed from the circumferential channel 13. A circumferential rim 15 projecting axially on the hub part 5 engages into the circumferential channel 13. The circumferential channel 13 and the circumferential rim 15, thus, form a type of labyrinth seal whereby encroachment of pressed material into the space lying between the hub part 5 and the dome-shaped protuberance 12 can be at least substantially prevented.

Figure 2:
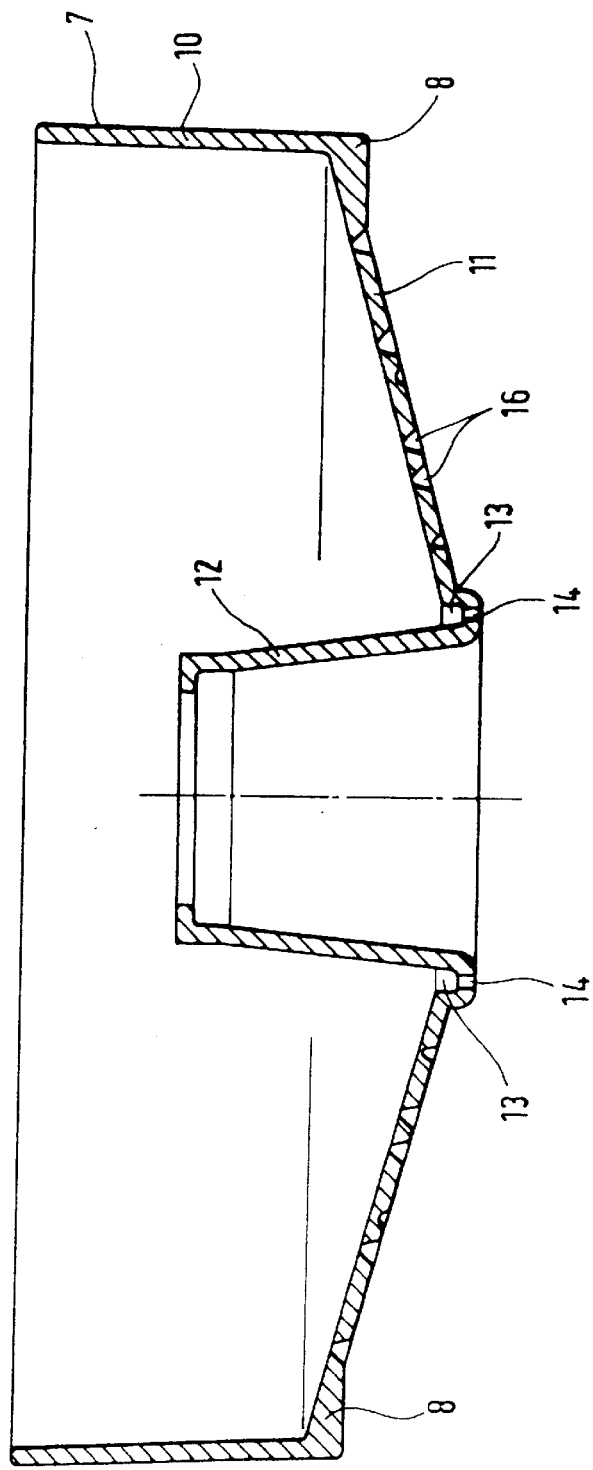
FIG. 2 is a cross-sectional view of a pot-shaped straining part of FIG. 1.

Through-apertures 16 are provided in the pot base 11 of the straining part 7, through which the pressing blades 6 force the pressed material. The through-apertures 16 are conically widened toward the discharge side of the pressed material. As a result of the widening, blocking of the through-apertures 16 is prevented. The through-apertures 16 are also shown in FIG. 2.

The pressing blades 6 each have a plurality of sawtooth protuberances 17 on the side facing the pot base 11 of the straining part 7 which extend from the hub part 5 to the free end of the pressing blades 6. The leading flank 18 of these protuberances 17 is constructed to rise gently counter to the direction of rotation of the pressing blades 6, as is indicated by an arrow 19 in FIG. 3. As a result of the gentle ascent, not only can the adhesion of pressed material to the protuberances 17 be avoided as far as possible but also the protuberances 17 effect an adequate onward conveyance of the pressed material.

Figure 5:
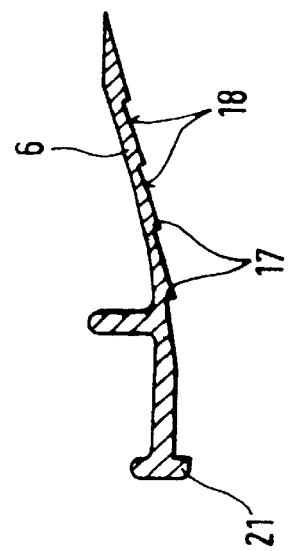
FIG. 5 is a cross-sectional view of the pressing blade of FIG. 3 in a region of the free end of the blade.
Figure 4:
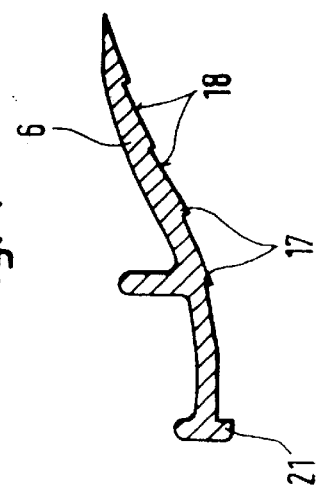
FIG. 4 is a cross-sectional view of the pressing blade of FIG. 3 in a center region of the blade.
Figure 3:
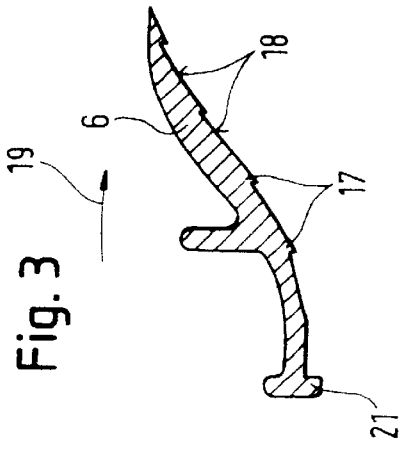
FIG. 3 is a cross-sectional view of a pressing blade of FIG. 1 in a region adjoining a hub part.

As can be seen from the cross-sectional profiles of the pressing blades in FIGS. 3, 4, and 5, the curvature of the pressing blades 6 exhibits a pitch that decreases from the hub part 5 to the free end of the pressing blade 6, in other words, starting from the hub part 5, the curvature becomes more shallow toward the free end. As a result, a surface of the pressing blades 6 is formed that is twisted in the manner of a helix. As a result of the helical twisting, force acting toward the middle of the straining part 7 is exerted on the pressed material. The conveyance of the pressed material toward the middle of the straining part 7, already predetermined by the funnel-like course of the pot base 11, is, thus, further assisted.

A cutting edge 21 projecting toward the pot base 11 of the straining part 7 is formed at the trailing end, in the direction of rotation (arrow 19), of each pressing blade 6. The cutting edge 21 is at a minimal distance from the pot base 11. Thus, the quantity of strained material sliding through below the cutting edge 21 is greatly reduced. In addition, the cutting edge 21, because of its sharp edge, is capable without difficulty of comminuting more solid constituents of the strained material.

Figure 6:
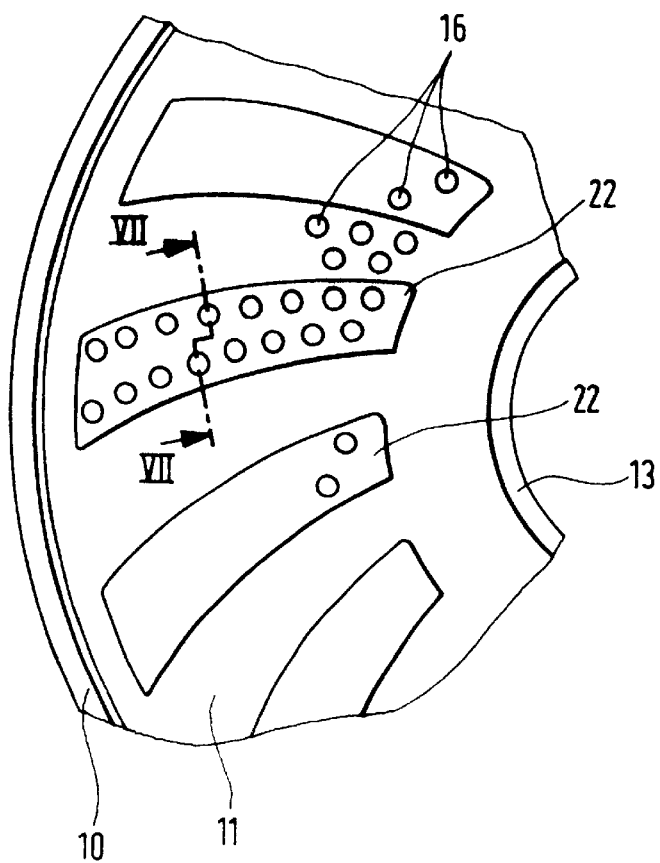
FIG. 6 is a fragmentary, plan elevational view of a pot base of the straining part of FIG. 2.
Figure 7:
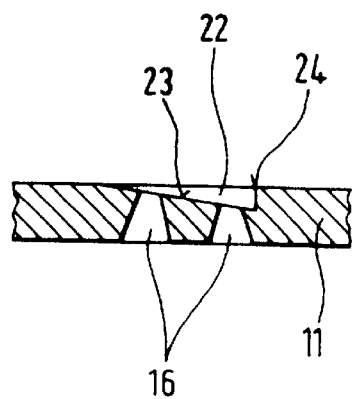
FIG. 7 is a fragmentary sectional view of a base recess along the line VII—VII in FIG. 6.

Also provided on the pot base 11 of the straining part 7 are base recesses 22 extending in the manner of spokes from the central region of the pot base 11 to the pot shell 10 and within which some of the through-apertures 16 are disposed. Additional through-apertures 16 may be provided in the region of the pot base 11 lying between the base recesses 22 (see FIG. 6). The base recesses 22 have a wedge-shaped cross-section such that a flank 23, descending in the direction of rotation of the pressing blades 6, is obtained for the base recesses 22. Thus, on the limiting side of the base recesses 22 lying in the direction of rotation, a sharp angled edge 24 is produced. The sharp angled edge 24 interacts with the cutting edge 21 in the manner of a pair of scissors, which results in an improvement in the comminution of the pressed material.

The base recesses 22 are curved in a sickle-shaped manner counter to the direction of rotation of the pressing blades 6. As a result, the sharp angled edges 24 come into engagement only gradually with the rotating cutting edge 21 during its rotational movement over its entire radial extent; in other words, the engagement between the cutting edge 21 and the angled edges 24 takes place steadily so that impacts imposing a strain on the drive motor are avoided.

We claim:

1. A strainer press for a food processor having a driveshaft, a mixing bowl, and a pot-shaped straining part having through-apertures and being disposed in the mixing bowl in a rotationally fixed manner with respect to the mixing bowl, the strainer press comprising:
    a pressing tool having:
        a hub part removably secured to the driveshaft; and
        at least two pressing blades rotating in a rotation direction at a given distance above the straining part, each of said at least two pressing blades having:
            a side facing the straining part;
            a trailing end edge with respect to said rotation direction;
            a plurality of rib-shaped protuberances extending substantially over an entire length of said at least two pressing blades on said side facing the straining part; and
            a cutting edge projecting toward the straining part and disposed at said trailing end edge.

2. The strainer press according to claim 1, wherein:
    the straining part has a middle and a pot base inclined in a funnel shape toward the middle of the straining part; and said pressing blades extend in a correspondingly inclined funnel-shape matching the pot base of the straining part.

3. The strainer press according to claim 2, wherein said pressing blades have a leading edge with respect to said rotation direction and are curved in a circumferential direction to raise said leading edge, in said rotation direction, of each pressing blade relative to the pot base of the straining part.

4. The strainer press according to claim 3, wherein:
said pressing blades each have a free end;
said curved pressing blades define a curvature; and
said curvature has a pitch decreasing from said hub part toward said free end.

5. The strainer press according to claim 1, wherein said protuberances are disposed over an entire width of said pressing blades.

6. The strainer press according to claim 5, wherein said protuberances have a sawtooth cross-section with a front flank rising counter to said rotation direction of said pressing blades.

7. The strainer press according to claim 1, wherein:
the mixing bowl has a bottom, a center, and a tubular connector disposed at the center;
the driveshaft is guided from the bottom of the mixing bowl through the tubular connector;
the straining part has:
a pot base with a middle; and
a dome-shaped protuberance extending into said hub part and centered relative to the middle of the pot base;
the dome-shaped protuberance and the pot base define therebetween a transitional region with a circumferential channel; and
said hub part has an axially projecting circumferential rim engaging the circumferential channel.

8. The strainer press according to claim 7, wherein the circumferential channel has a base and at least one through-bore in the base.

9. The strainer press according to claim 1, wherein:
the straining part has a pot base with base recesses formed thereon extending at least approximately in a spoke pattern;
at least some of the through-apertures of the straining part are provided in the base recesses; and
the base recesses have a wedge-shaped cross-section with a declining leading flank with respect to said rotation direction of said pressing blades.

10. The strainer press according to claim 9, wherein the flank and said cutting edge form a cutting cleaver.

11. The strainer press according to claim 9, wherein:
the base recesses extend in a radiation direction; and
the base recesses follow, in the radiation direction, a sickle-shaped course curved counter to said rotation direction of said pressing blades.

12. The strainer press according to claim 9, wherein:
the pot base has a center; and
the base recesses extend from a center end adjacent the center to an outer end remote from the center end and have a depth increasing from the center end to the outer end.

13. The strainer press according to claim 9, wherein the through-apertures have an entry side and a discharge side and broaden in cross-section from the entry side toward the discharge side.

14. The strainer press according to claim 1, wherein:
the mixing bowl has ribs; and
the straining part has rib-shaped shoulders interacting with corresponding ones of the ribs of the mixing bowl.

15. The strainer press according to claim 1, wherein:
said pressing tool is of injection-molded plastic; and
the straining part is of injection-molded plastic.

16. The strainer press according to claim 1, wherein said given distance is substantially adjacent the straining part.

17. In a food processor having a driveshaft, a mixing bowl, and a pot-shaped straining part having through-apertures and being disposed in the mixing bowl in a rotationally fixed manner with respect to the mixing bowl, a strainer press comprising:
a pressing tool having:
a hub part removably secured to the driveshaft; and
at least two pressing blades rotating in a rotation direction at a given distance above the straining part, each of said at least two pressing blades having:
a side facing the straining part;
a trailing end edge with respect to said rotation direction;
a plurality of rib-shaped protuberances extending substantially over an entire length of said at least two pressing blades on said side facing the straining part; and
a cutting edge projecting toward the straining part and disposed at said trailing end edge.

18. A food processor, comprising:
a driveshaft;
a mixing bowl;
a pot-shaped straining part having through-apertures, said straining part removably disposed in said mixing bowl in a rotationally fixed manner with respect to said mixing bowl; and
a pressing tool having:
a hub part removably secured to said driveshaft; and
at least two pressing blades rotating in a rotation direction at a given distance above said straining part, each of said at least two pressing blades having:
a side facing said straining part;
a trailing end edge with respect to said rotation direction;
a plurality of rib-shaped protuberances extending substantially over an entire length of said at least two pressing blades on said side facing said straining part; and
a cutting edge projecting toward said straining part and disposed at said trailing end edge.

19. The strainer press according to claim 18, wherein:
said straining part has a middle and a pot base inclined in a funnel shape toward said middle of said straining part; and
said pressing blades extend in a correspondingly inclined funnel-shape matching said pot base of said straining part.

20. The strainer press according to claim 18, wherein said pressing blades have a leading edge with respect to said rotation direction and are curved in a circumferential direction to raise said leading edge, in said rotation direction, of each pressing blade relative to said pot base of said straining part.

21. The strainer press according to claim 20, wherein:

said pressing blades each have a free end;

said curved pressing blades define a curvature; and said curvature has a pitch decreasing from said hub part toward said free end.

22. The strainer press according to claim 18, wherein said protuberances are disposed over an entire width of said pressing blades.

23. The strainer press according to claim 22, wherein said protuberances have a sawtooth cross-section with a front flank rising counter to said rotation direction of said pressing blades.

24. The strainer press according to claim 18, wherein:

said mixing bowl has a bottom, a center, and a tubular connector disposed at said center;

said driveshaft is guided from said bottom of said mixing bowl through said tubular connector;

said straining part has:
  a pot base with a middle; and
  a dome-shaped protuberance extending into said hub part and centered relative to said middle of said pot base;

said dome-shaped protuberance and said pot base define therebetween a transitional region with a circumferential channel; and said hub part has an axially projecting circumferential rim engaging said circumferential channel.

25. The strainer press according to claim 24, wherein said circumferential channel has a base and at least one through-bore in said base.

26. The strainer press according to claim 18, wherein:

said straining part has a pot base with base recesses formed thereon extending at least approximately in a spoke pattern;

at least some of said through-apertures of said straining part are provided in said base recesses; and said base recesses have a wedge-shaped cross-section with a declining leading flank with respect to said rotation direction of said pressing blades.

27. The strainer press according to claim 26, wherein said flank and said cutting edge form a cutting cleaver.

28. The strainer press according to claim 26, wherein:

said base recesses extend in a radiation direction; and said base recesses follow, in said radiation direction, a sickle-shaped course curved counter to said rotation direction of said pressing blades.

29. The strainer press according to claim 26, wherein:

said pot base has a center; and said base recesses extend from a center end adjacent said center to an outer end remote from said center end and have a depth increasing from said center end to said outer end.

30. The strainer press according to claim 26, wherein said through-apertures have an entry side and a discharge side and broaden in cross-section from said entry side toward said discharge side.

31. The strainer press according to claim 18, wherein:

said mixing bowl has ribs; and said straining part has rib-shaped shoulders interacting with corresponding ones of said ribs of said mixing bowl.

32. The strainer press according to claim 18, wherein said pressing tool and said straining part are of injection-molded plastic.

33. The strainer press according to claim 18, wherein said given distance is substantially adjacent the straining part.

* * * * *